United States Patent [19]

Kawabata et al.

[11] 4,456,218
[45] Jun. 26, 1984

[54] FLUID CONTROL VALVE

[75] Inventors: Yasuhiro Kawabata, Anjo; Kongo Aoki, Kariya, both of Japan

[73] Assignee: Aisin Seiki Kabushiki Kaisha, Kariya, Japan

[21] Appl. No.: 467,743

[22] Filed: Feb. 18, 1983

Related U.S. Application Data

[63] Continuation of Ser. No. 230,259, Jan. 30, 1981, abandoned.

[30] Foreign Application Priority Data

Jan. 30, 1980 [JP] Japan .................................. 55-011058

[51] Int. Cl.³ .............................................. F16K 31/365
[52] U.S. Cl. ...................................... 251/61.5; 251/214
[58] Field of Search .................. 251/61, 61.5, 63, 63.5, 251/63.6, 214, 324; 123/568

[56] References Cited

U.S. PATENT DOCUMENTS

| | | | |
|---|---|---|---|
| 2,688,977 | 11/1954 | Droitcour et al. | 251/61.5 |
| 2,910,081 | 10/1959 | Karbowniczek | 251/324 |
| 3,363,412 | 1/1968 | Fischer et al. | 251/324 |
| 3,426,998 | 2/1969 | Kintner | 251/324 |
| 3,434,694 | 3/1969 | Skinner | 251/324 |
| 3,461,913 | 8/1969 | Scott | 251/61.5 |
| 3,472,480 | 10/1969 | Williams | 251/63 |
| 3,789,875 | 2/1974 | McGee | 251/63.6 |
| 4,163,543 | 8/1979 | Cook | 251/61.5 |
| 4,218,040 | 8/1980 | Brakebill | 123/568 |
| 4,269,028 | 5/1981 | Hattori | 251/61 |

FOREIGN PATENT DOCUMENTS 20903  2/1980  Japan .................................. 251/61.65

*Primary Examiner*—Alan Cohan
*Assistant Examiner*—John A. Rivell
*Attorney, Agent, or Firm*—Oblon, Fisher, Spivak, McClelland & Maier

[57] ABSTRACT

A fluid control valve actuated by differential pressure across a diaphragm member. The diaphragm member is secured to a piston mounted thereon with a seal ring. The seal ring is in fluid-tight sliding engagement with a casing having an inlet port and an outlet port, but is brought into disengagement from the casing upon movement of the piston due to differential pressure across the diaphragm member. Thus, communication between the inlet and the outlet ports may be accomplished.

1 Claim, 1 Drawing Figure

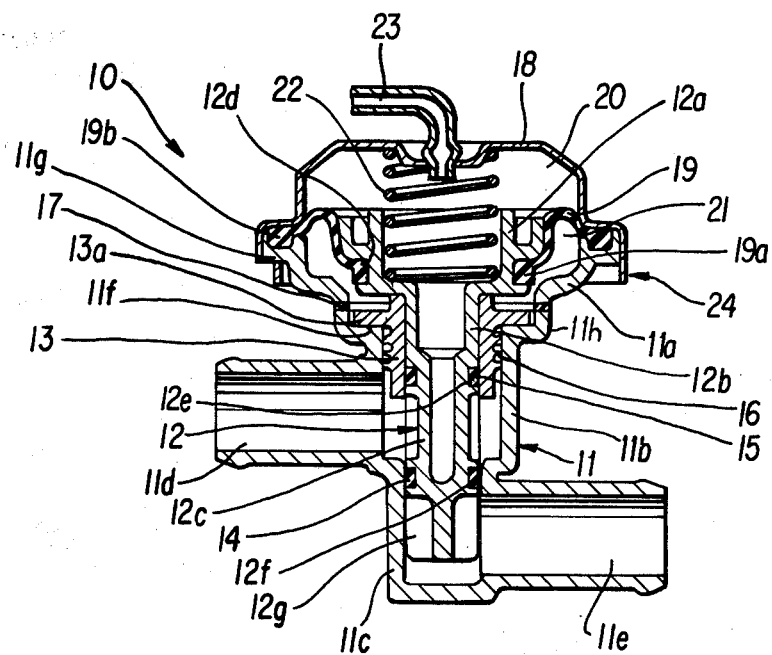

FLUID CONTROL VALVE

This is a continuation of application Ser. No. 230,259 filed Jan. 30, 1981 now abandoned.

BACKGROUND OF THE INVENTION

1. Field of the Invention:

This invention relates to a fluid control valve, and more particularly to a fluid control valve in which a valve body is so constructed that it may be moved by a vacuum pressure actuator.

2. Description of the Prior Art:

There has been provided a fluid control valve in which a valve body is moved towards or apart from a valve seat by actuation of differential pressure across a diaphragm member. However, the valve body and a diaphragm retainer being manufactured independently therefrom are connected together by means of a screw, calking or other similar member. Thus, the corresponding number of parts in the fluid control valve are necessarily increased with the result that the cost thereof in manufacture may not be reduced.

Further, the diaphragm retainer is so urged by a spring that the valve member may be brought into fluid-tight contact with the valve seat. However, the valve member sometimes adheres to the valve seat with the result that the valve member may not be removed from the valve seat, thereby causing incomplete functioning of the valve.

SUMMARY OF THE INVENTION

It is, therefore, one of the objects of the present invention to provide a fluid control valve without the aforementioned drawbacks of the prior art.

It is another object of the present invention to provide a fluid control valve in which a valve member and a diaphragm retainer are integrated into a single unitary piston.

It is a further object of the present invention to provide a fluid control valve in which action is accomplished by fluid-tight sliding engagement between a piston and a casing.

BRIEF DESCRIPTION OF THE DRAWINGS

These and other objects of the present invention will be apparent from the following description of the preferred embodiment, having reference to the drawing wherein:

The sole FIGURE illustrates a transverse sectional view of a fluid control valve in accordance with the present invention.

DETAILED DESCRIPTION OF THE PREFERRED EMBODIMENT

Referring now to the sole FIGURE, there is illustrated a fluid control valve 10 in accordance with the present invention. The valve 10 includes a valve casing 11 provided with a cup-shaped upper portion 11a, a cylindrical intermediate portion 11b, and a cylindrical lower portion 11c.

The diameter of lower portion 11c is smaller than that of intermediate portion 11b. Intermediate portion 11b is connected to an inlet port 11d which is in communication with a water pump (not shown). Lower portion 11c is connected to an outlet port 11e which is in communication with a heater core in an air-conditioner (not shown).

In valve casing 11, a guide member 13 is positioned in such a manner that a flange 13a thereof is held between a shoulder 11f of the casing 11 and a snap ring 17 fixed in an inner groove 11h of casing 11. A seal ring 16 is fitted on a guide member 13 for avoiding a fluid tight seal between guide member 13 and casing 11.

Reference numeral 12 designates a piston which has an upper recessed portion 12a, an intermediate portion 12b, and a lower portion 12c. The intermediate portion 12b is fluid-tightly and slidably mounted in guide member 13. A seal ring 15 is fitted in an outer groove 12e formed in intermediate portion 12b so as to provide a fluid-tight seal between intermediate portion 12b and guide member 13. Upper portion 12a is formed with an outer groove 12d in which an inner periphery portion 19a of a diaphragm member 19 is fitted. An outer periphery portion 19b of diaphragm member 19 is held between an outer edge 11g of casing 11 and a cover member 18 rigidly coupled thereto. Thus, cover member 18 and casing 11 constitute a housing 24.

In housing 24, a first chamber 20 and a second chamber 21 are defined by piston 12, guide member 13, and diaphragm member 19. First chamber 20 is so connected to a vacuum source (not shown) via a port 23 that vacuum is communicated to first chamber 20 as a signal. Second chamber 21 is continually in communication with atmospheric pressure. A spring 22 is stretched between cover member 18 and piston 12 in a downward direction as viewed in the sole FIGURE.

Lower portion 12c of piston 12 is in fluid-tight sliding engagement with lower portion 11c. The fluid-tight seal between both lower portions 11c and 12c is assured by a seal ring 14 fitted in an outer groove 12f formed in lower portion 12c of piston 12 in the illustrated condition, but is released due to disengagement of seal ring 14 from lower portion 11c of casing 11 upon upward movement of piston 12.

In operation, while a vacuum pressure signal is not being applied to first chamber 20, piston 12 is located at the rest position as illustrated so that the fluid-tight seal between lower portions 11c and 12c is maintained or assured with the result that inlet port 11d is not in communication with outlet port 11e. Consequently, hot water may not be supplied from the water pump to the heater core via fluid control valve 10.

When a vacuum pressure signal is being applied to the first chamber 20, first chamber 20 is reduced in pressure with the result that piston 12 is moved in an upward direction against spring 22. In accordance with upward movement of piston 12, the fluid-tight seal between lower portions 11c and 12c is released due to disengagement of seal ring 14 from lower portion 11c of casing 11. Thus, inlet port 11d is brought into communication with outlet port 11e through axial grooves 12g with the result that hot water is supplied to the heater core of the air-conditioner from the water pump via fluid control valve 10.

According to the present invention, piston 12 is operated as both a valve member and a diaphragm retainer, thereby resulting in a decrease in the total number of parts and corresponding cost in manufacture of the valve. Further, since the valve action is performed by fluid-tight sliding engagement between piston 12 and casing 11, the possibility of incomplete functioning of the valve is greatly reduced.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A fluid control valve comprising:

a casing having an inlet port and an outlet port, a cover member rigidly coupled to said casing and including a port member formed therein, vacuum pressure signal means communicating with said port member formed in said cover member;

a piston slidably mounted in said casing, first seal ring means mounted on said piston for providing fluid-tight seal between said piston and said casing, a diaphragm member having an outer periphery portion and an inner periphery portion, said outer periphery portion being held between said cover member and said casing, said inner periphery portion being secured to said piston, a first chamber defined by said piston, said diaphragm member and said cover member, and communicating with said vacuum pressure signals via said port formed in said cover member, a second chamber defined by said piston, said diaphragm member and said first seal ring means, and in constant communication with atmospheric pressure, spring means positioned between said cover member and said piston for urging said piston in one axial direction thereof, and second seal ring means mounted on said piston in fluid-tight sliding engagement with said casing so as to be disengaged therefrom upon axial movement of said piston wherein said first seal ring means further comprises a guide member mounted within said casing, a first seal ring member fluid-tightly mounted between said guide member and said piston and a second seal ring member fluid-tightly mounted between said guide member and said casing and wherein said guide member further comprises a flange portion and said casing further comprises a shoulder portion and an inner groove portion, and further comprising a snap ring positioned in said inner groove portion such that said flange portion is held between said shoulder portion and said snap ring.

* * * * *